June 29, 1926.
H. M. FUNNELL
UNIVERSAL JOINT
Filed Sept. 16, 1925
1,590,992
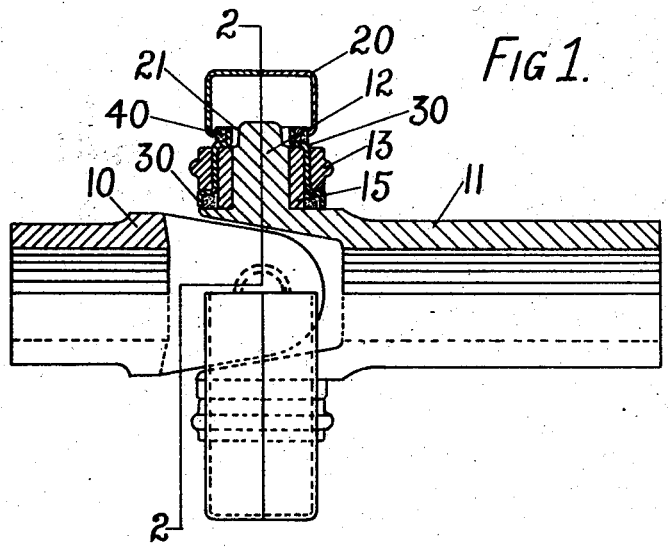
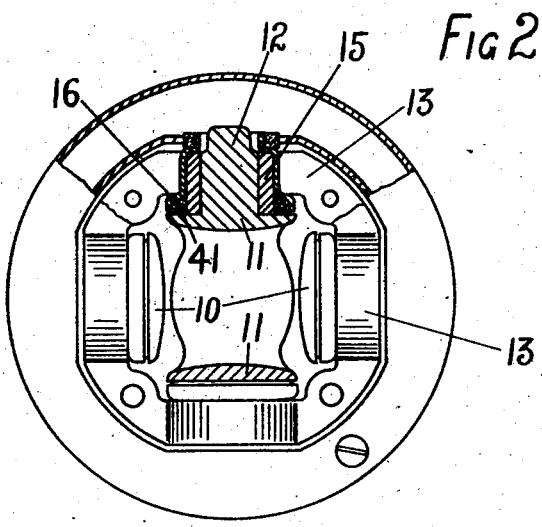
HARRY MAWSON FUNNELL
INVENTOR
ATTORNEY Patented June 29, 1926.

UNITED STATES PATENT OFFICE.

HARRY MAWSON FUNNELL, OF NEW MARKET, NEW JERSEY.

UNIVERSAL JOINT.

Application filed September 16, 1925. Serial No. 56,767.

My invention relates to universal joints or couplings used universally on automobiles or otherwise where angular movement is required between a driving and driven shaft, and more particularly to the torque ring and trunnion type; and has for its object, to produce a joint in which the lubrication is simplified, and conserved within the joint so that the joint will not run dry.

In my United States Patent 1,451,946 granted to me April 17, 1923, I disclosed a type of joint in which the oil reservoir is placed exteriorly to a point at which leakage can occur while the joint is in action. While this has overcome certain disadvantages common to joints of this type by substantially preventing oil under pressure due to centrifugal force from throwing off it necessitated lubricating the joint in four places and produced a plurality of lubricating holes where the lubricant may be forced out by centrifugal force while the joint is in motion.

One of the objects of this invention is to provide a single lubricant chamber with no exterior opening through which the lubricant can escape through centrifugal force, and one that is entirely separate from the torque ring.

The foregoing and other features of my invention will now be described in connection with the accompanying drawing forming part of this specification in which I have represented my universal joint in its preferred form after which I shall point out more particularly in the claims those features which I believe to be new and of my own invention.

In the drawings:

Figure 1 is a side elevation, in part section, of my universal joint.

Figure 2 is a section along the line 2—2 Figure 1.

In the drawings I employ forked terminal members 10 and 11 each provided with two trunnions 12 engaged by a torque member in the form of an annular ring 13. As this is a common type of universal joint, the details require no further description.

Entirely outside of the torque member and held in spaced relations thereto I provide an annular lubricant chamber 20 made of sheet metal or die casting. On the inner circumference of which I provide four radial openings 21 adapted to interfit with housings 30, a packing washer 40 in between to make the joint tight. The housings 30 are cylindrical with a flange on each end and are of a size so that the bushings 15 are pressed thereinto, leaving an annular space 16 to be filled up by a packing 41.

The end of the trunnion is extended beyond the bushing into the lubricant chamber and is a part of the splash system of lubrication disclosed in my former patent heretofore identified.

It will be observed by referring to the drawings, that the lubricant chamber is entirely outside the points where oil will be thrown off the trunnions, and that the lubricant can not be thrown out of the annular chamber by centrifugal force. It will also be observed that with this construction there are no joints through which the lubricant can escape thereby providing a lubricant chamber that will retain the oil indefinitely.

I wish it distinctly understood that my universal joint herein described and illustrated is in the form in which I desire to construct it but that changes or variations may be made as may be convenient or desirable without departing from the salient features of my invention and I, therefore, intend the following claims to cover such modifications as naturally fall within the lines of invention.

I claim—

1. A universal joint or shaft coupling of the ring and trunnion type comprising a torque ring, a separate annular lubricant reservoir located coaxial with and entirely without the torque ring, housings for the trunnion bushings held by the torque ring and communicating with the lubricant reservoir.

2. A universal joint or shaft coupling of the ring and trunnion type, comprising in construction a torque ring, a separate annular lubricant chamber located coaxial with and entirely outside the torque ring and provided with radial openings on the inner circumference thereof, retainers interposed between the ring and trunnion bushings, held from turning by the torque ring and provided with extensions which interfit with the lubricant chamber.

In testimony whereof I affix my signature.

HARRY MAWSON FUNNELL.